Dec. 12, 1967 J. N. SHEARME 3,358,157

SELECTIVE GATE CIRCUITS

Filed April 29, 1965 2 Sheets-Sheet 1

Inventor
J. N. SHEARME
By Cameron, Kerkam & Sutton
Attorneys

Inventor
J. N. SHEARME
By Cameron, Kerkam & Sutton
Attorneys

United States Patent Office 3,358,157
Patented Dec. 12, 1967

3,358,157
SELECTIVE GATE CIRCUITS
John Noel Shearme, Chesham Bois, England, assignor to Minister of Aviation in Her Britannic Majesty's Government of the United Kingdom of Great Britain and Northern Ireland, London, England
Filed Apr. 29, 1965, Ser. No. 451,715
Claims priority, application Great Britain, Apr. 30, 1964, 17,985/64
6 Claims. (Cl. 307—88.5)

ABSTRACT OF THE DISCLOSURE

A selective array formed of interconnected gate circuits has a plurality of analogue signal input lines and an equal number of analogue signal output lines, and has the property of transmitting analogue signals without inversion or substantial alteration from some of the input lines to corresponding ones of the output lines when and only when the said analogue signals have greater analogue values than any analogue signals applied to adjacent ones of the said input lines. A speech signal may be fed through a set of band-pass filters and rectifier units to such an array, for identifying and/or tracking its formant frequencies.

This invention relates to selective gate circuits arranged to allow the passage of a signal applied to a principal input of the circuit when and only when there is no signal of greater instantaneous voltage applied to any one subsidiary input of the circuit, and more particularly to arrangements of said circuits for selecting and transmitting the more significant signals from a set of variable analogue signals on separate lines which are arranged in a given order, where the signal on any line is considered more significant when it has a greater analogue value than the signals on adjacent lines of the set. Embodiments of the invention may, for instance, be used in speech analysis equipment for identifying or tracking formant frequencies in a frequency-divided speech signal.

According to the present invention, there is provided a selective array of gate circuits comprising a set of analogue signal input lines, at least three in number and arranged in a given order, an equal number of transistors each having its emitter connected to a separate one of said analogue signal input lines, an equal number of collector-circuit resistors each connected from the collector of a separate one of said transistors to a power supply connection, an equal number of base-circuit resistors each connected from the base of a separate one of said transistors to a power supply connection, an equal number of analogue signal output lines each connected to the collector of a separate one of said transistors, and a plurality of unilaterally conductive devices each connected from the base of one of said transistors to a one of said analogue signal input lines which is adjacent in said given order to that one of said analogue signal input lines which is connected to the emitter of the same one of said transistors, said unilaterally conductive devices being connected in such polarity that their forward currents will flow through the said base-circuit resistors in the same direction as the base currents of said transistors, and wherein those of the said analogue signal input lines other than the first and the last in the said given order are each connected to at least two of said unilaterally conductive devices.

In embodiments of the invention for use in identifying or tracking formant frequencies in an electrical signal representing speech, there is also provided a set of rectifying units and a set of band-pass filters having different pass-bands, the said filters being arranged in the order of the frequencies of their pass-bands and each connected to a separate one of the said analogue signal input lines through a separate one of said rectifying units.

Figure 1:
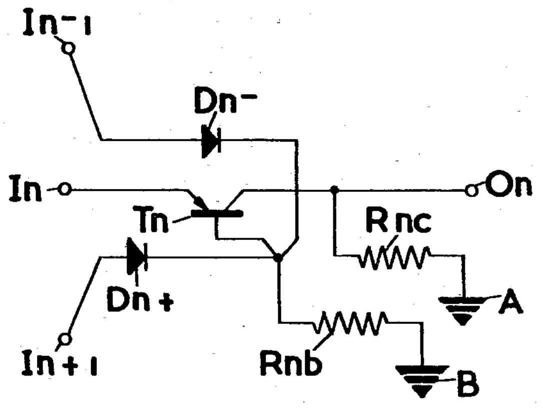
Figure 2:
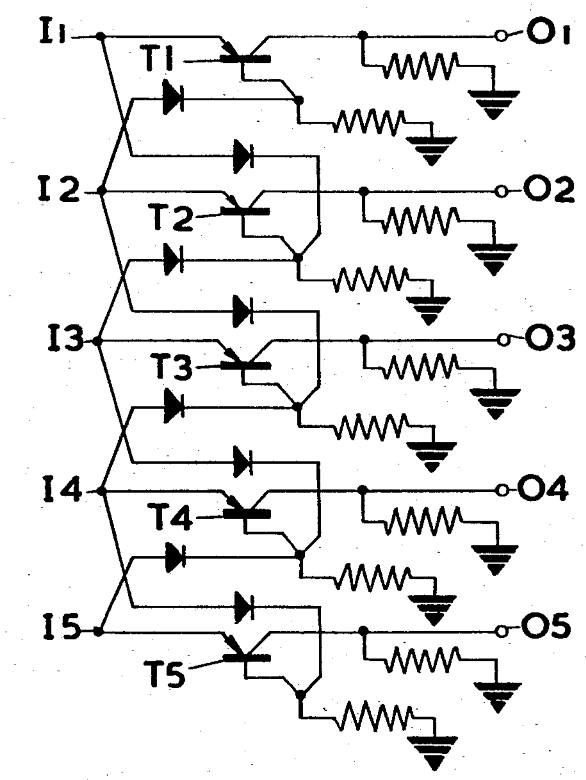
Figure 3:
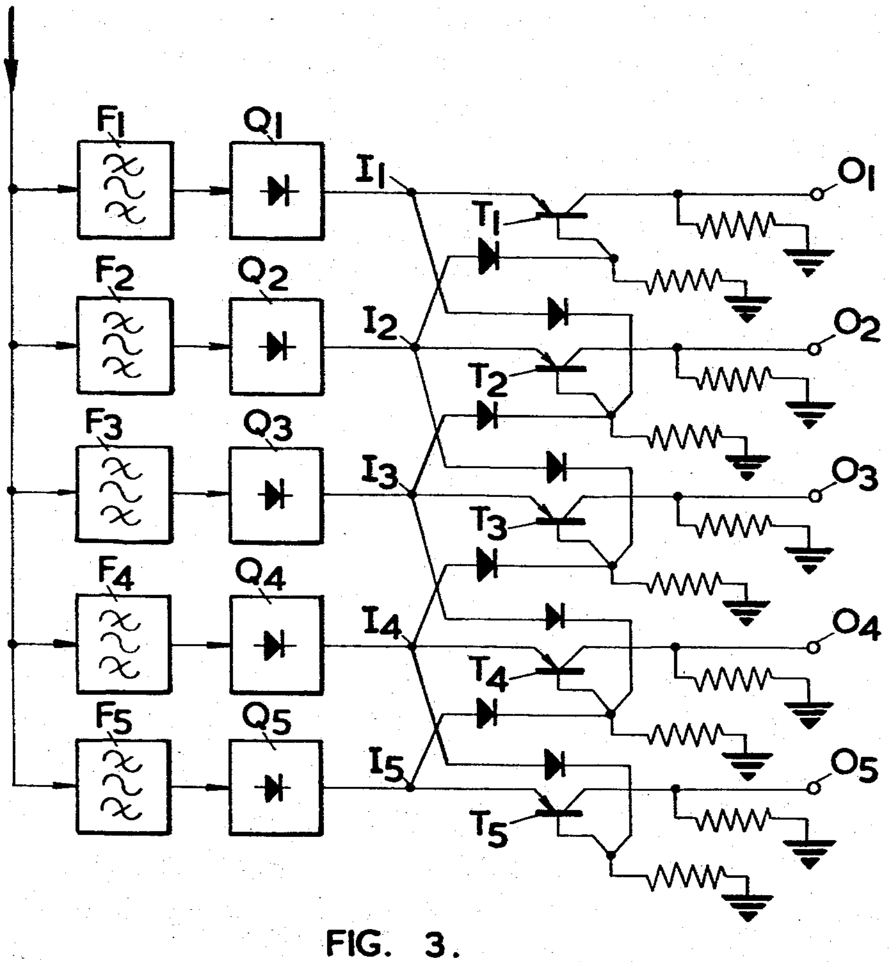

Embodiments of the invention will now be described, with reference to the accompanying drawings, of which FIGURE 1 is a circuit diagram of a gate circuit, FIGURE 2 is a circuit diagram of a selective array of circuits of the type shown in FIGURE 1, and FIGURE 3 is a circuit diagram of one form of speech analysis equipment embodying the selective array of gate circuits shown in FIGURE 2.

FIGURE 1 shows a transistor T*n*, a principal input connection I*n* connected to the emitter of the transistor T*n*, and an output connection O*n* connected to the collector of the transistor T*n*. The base of the transistor T*n* is connected to subsidiary input connection I*n*—1 and I*n*+1 through rectifier diodes D*n*— and D*n*+ respectively, and is also connected to an earth return connection B through a resistance R*nb*. The collector of the transistor T*n* is also connected to an earth return connection A through a resistance R*nc*. The transistor T*n* is a pnp transistor, and the polarity of the diodes permits forward current flow from the input terminals I*n*—1 and I*n*+1 towards the resistance R*nb*. Circuits similar to that of FIGURE 1 have been suggested as gates for signal switching under the control of clock pulses or as required by switching command signals from a separate controller. In the application described hereinafter, no clock pulses or separate switching command signals are used. The gate circuits are used in a novel manner and in a novel array to sort out important signals from less important signals as will hereinafter be explained.

The operation of the circuit of FIGURE 1 will now be described. Variable signals are applied to the input connections I*n*—1, I*n*, and I*n*+1. When the instantaneous potential at the subsidiary input connection I*n*—1 has a positive value more positive than the instantaneous potentials at the remaining input connections I*n* and I*n*+1, current flows through the diode D*n*— and the resistance R*nb* to the earth return connection B. The potential drop across the diode D*n*— is small and the potential at the base of the transistor T*n* rises to a value only slightly less than that of the potential at the input connection I*n*—1. Hence the potential at the emitter of the transistor T*n* cannot be significantly more positive than the potential at its base. If the emitter potential is more positive than the base potential, the difference between these potentials must be very small, in fact less than the forward voltage drop across the conducting diode D*n*—. (This follows since we are considering the case when the input at the connection I*n*—1 has a more positive potential than the input at the connection I*n*.) The transistor T*n* is, therefore, non-conducting and no signals are developed in its collector circuit. For similar reasons, the diode D*n*+ is also non-conducting and the input to the connection I*n*+1 is isolated from the input to the connection I*n*—1.

When the instantaneous potential at the subsidiary input connection I*n*+1 has a positive value more positive than the instantaneous potentials at the remaining input connections I*n* and I*n*—1, a similar action ensuses in which the diode D*n*+ conducts while the diode D*n*— and the transistor T*n* do not conduct.

When the instantaneous potential at the input connection I*n* becomes more positive than the instantaneous potentials at the inputs I*n*+1 and I*n*—1 and therefore more positive than the potential at the base of the transistor T*n*, however, current flows from the input connection I*n* through the transistor T*n* and the resistance R*nb*. This raises the base potential so that the diodes D*n*— and D*n*+ are reverse biassed and do not conduct; the input connections I*n*—1 and I*n*+1 are thereby isolated from the input to the connection I*n*. The resistances R*nb* and $R_{nc}$ should be suitably chosen so that saturation collector current is drawn by the transistor $T_n$, and an output signal substantially equivalent to the input signal at the input connection $I_n$ is developed at the output connection $O_n$.

An array of selective gate circuits of the type described above may be used to analyse a group of input signals such as the outputs of a set of frequency discriminating filters in speech analysis equipment. FIGURE 2 shows such an array of selective gate circuits connected between inputs I1, I2 . . . I5 and outputs O1, O2 . . . O5. The input I1 to I5 are connected as the principal inputs of selective gate circuits including the transistors T1 to T5 respectively. The gate circuit including the transistor T1, whose principal input is the input line I1, has only one subsidiary input and this subsidiary input is connected to the input line I2. The gate circuit including the transistor T5, whose principal input is the input line I5, has only one subsidiary input and this subsidiary input is connected to the input line I4. The remaining gate circuits each have two subsidiary inputs connected respectively to the two input lines adjacent to the principal input of the circuit; for instance, the gate circuit including the transistor T3, whose principal input is the input line I3, has two subsidiary inputs connected to the input lines I2 and I4 respectively.

An array of selective gate circuits, such as the array shown in FIGURE 2, may be used to track formant frequencies in a speech waveform. In this application, as illustrated in FIGURE 3 the speech waveform is applied to a set of frequency discriminating band-pass filters F1 to F5. Output signals from the band-pass filters are separately rectified by rectifier units O1 to O5 and applied to the inputs I1 to I5 respectively of the array of FIGURE 2. Each of these signals indicates the amount of energy carried in a certain frequency band by the speech waveform. The signals relating to adjacent frequency bands are applied to adjacent inputs of the array. A frequency band which includes the frequency of a formant present in the speech waveform, will carry a greater energy than the adjacent frequency bands if the frequency bands are suitably chosen. Hence a frequency band including a formant frequency provides a greater signal than is provided by the adjacent frequency bands, at the inputs of the array. The signal from the formant-carrying band therefore passes through the selective gate circuit to which it is applied as the principal input, and appears at the output of that gate circuit. The signals from the bands adjacent to the formant-carrying band are blocked by the selective gate circuit to which they are the principal inputs, because these gate circuits each have the greater signal due to the formant-carrying band applied to one of their subsidiary inputs. The occurrence of a signal at one of the outputs O1 to O5 therefore indicates that the frequency band associated with that output carries a greater energy than the adjacent frequency bands, so implying that it includes a formant frequency of the original speech signal.

It should be clearly understood that the above embodiments have been described by way of example only, as many variations thereof will be obvious to persons skilled in the art. Any number of subsidiary inputs may be connected to a selective gate circuit in the manner hereinbefore described, and any number of selective gate circuits may be combined to form an array. The inputs of such an array need not be outputs of a set of filters; other applications of the invention are possible. The above-described embodiments are arranged to operate on positive-going signals, but by using the diodes with reversed polarity and npn transistors in place of pnp transistors, similar circuits can be made to operate on negative-going signals. Voltage generating devices or additional impedances may be placed in series with one or more of the inputs of a selective gate circuit to modify its action. For instance, a battery or one or more diodes may be inserted in series with the principal input to ensure that the circuit will pass only those signals which exceed the greatest of the associated subsidiary input signals by at least a given voltage.

I claim:

1. A selective array of gate circuits comprising a set of analogue signal input lines, at least three in number and arranged in a given order, an equal number of transistors each having its emitter connected to a separate one of said analogue signal input lines, an equal number of collector-circuit resistors each connected from the collector of a separate one of said transistors to a power supply connection, an equal number of base-circuit resistors each connected from the base of a separate one of said transistors to a power supply connection, an equal number of analogue signal output lines each connected to the collector of a separate one of said transistors, and a plurality of unilaterally conductive devices each connected from the base of one of said transistors to a one of said analogue signal input lines which is adjacent in said given order to that one of said analogue signal input lines which is connected to the emitter of the same one of said transistors, said unilaterally conductive devices being connected in such polarity that their forward currents will flow through the said base-circuit resistors in the same direction as the base currents of said transistors, and those of the said analogue signal input lines other than the first and the last in the said given order being each connected to at least two of said unilaterally conductive devices.

2. A selective array of gate circuits comprising a set of analogue signal input lines, at least three in number and arranged in a given order, and a plurality of gate circuits each having an analogue signal output line, a principal input connected to a separate one of said analogue signal input lines and at least one subsidiary input connected to one of said analogue signal input lines which is adjacent in the said given order to the said separate one of said analogue signal input lines; wherein each of said gate circuits comprises a transistor having its emitter connected to said principal input and its collector connected to said analogue signal output line, a collector-circuit resistor connected from the collector of said transistor to a power supply connection, a base-circuit resistor connected from the base of said transistor to a power supply connection, and at least one unilaterally conductive device, each said subsidiary input being connected through said unilaterally conductive device to the base of said transistor in its gate circuit in such polarity that the forward current of said unilaterally conductive device will tend to flow through said base-circuit resistor in the same direction as the base current of said transistor.

3. A selective array of gate circuits comprising a set of analogue signal input lines, at least four in number and arranged in a given order, and a plurality of gate circuits each having a principal input connected to a separate one of said analogue signal input lines, an analogue signal output line and two subsidiary inputs separately connected to those of the said analogue signal input lines which in the said given order are adjacent to the said separate one of said analogue signal input lines; wherein each of said gate circuits comprises a transistor having its emitter connected to said principal input and its collector connected to said analogue signal output line, a collector-circuit resistor connected from the collector of said transistor to a power supply connection, a base-circuit resistor connected from the base of said transistor to a power supply connection, and two unilaterally conductive devices, each of said two subsidiary inputs being connected through one of said two unilaterally conductive devices to the base of said transistor in such polarity that said transistor's base current and the forward current of said unilaterally conductive device will tend to flow in the same direction through said base-circuit resistor.

4. A selective array as claimed in claim 3 comprising a first further gate circuit having a principal input and a subsidiary input respectively connected to the ones of said analogue signal input lines which are first and second in said given order, and a second further gate circuit having a principal input and a subsidiary input respectively connected to the ones of said analogue signal input lines which are last and penultimate in said given order, wherein said further gate circuits each comprise a transistor having its emitter connected to said principal input, an analogue signal output line connected to the collector of said transistor, a collector-circuit resistor connected from the collector of said transistor to a power supply connection, a base-circuit resistor connected from the base of said transistor to a power supply connection, and a unilaterally conductive device connected from said subsidiary input to the base of said transistor in such polarity that its forward current will flow through said base-circuit resistor in the same direction as the base current of said transistor.

5. A selective array of gate circuits as claimed in claim 3 in combination with a set of rectifying units and a set of band-pass filters having different pass-bands, the said filters being arranged in the order of the frequencies of their pass-bands and each connected to a separate one of the said analogue signal input lines through a separate one of said rectifying units.

6. A selective array of gate circuits as claimed in claim 4 in combination with a set of rectifying units and a set of band-pass filters having different pass-bands, the said filters being arranged in the order of the frequencies of their pass-bands and each connected to a separate one of the said analogue signal input lines through a separate one of said rectifying units.

References Cited

UNITED STATES PATENTS

| | | | |
|---|---|---|---|
| 2,864,961 | 12/1958 | Lohman et al. | 307—88.5 |
| 2,986,654 | 5/1961 | Gunning | 307—88.5 |
| 3,078,378 | 2/1963 | Burley et al. | 307—88.5 |

ARTHUR GAUSS, *Primary Examiner.*

J. S. HEYMAN, *Assistant Examiner.*